United States Patent [19] [11] 3,974,079
Woditsch et al. [45] Aug. 10, 1976

[54] PRODUCTION OF GAMMA IRON OXIDE

[75] Inventors: Peter Woditsch; Kurt Hill, both of Krefeld; Franz Hund, Krefeld-Bockum; Fritz Rodi, Kaldenhausen, all of Germany

[73] Assignee: Bayer Aktiengesellschaft, Germany

[22] Filed: Nov. 2, 1973

[21] Appl. No.: 412,488

Related U.S. Application Data

[63] Continuation-in-part of Ser. No. 249,547, May 2, 1972, abandoned.

[30] Foreign Application Priority Data

May 6, 1971 Germany............................ 2122312

[52] U.S. Cl............................... 252/62.56; 423/634
[51] Int. Cl.².......................................... C01G 49/06
[58] Field of Search........................... 423/633, 634; 252/62.56

[56] References Cited
UNITED STATES PATENTS 2,694,656   11/1954   Camras ............................... 117/235
3,382,174   5/1968   Hund .................................. 423/634
3,652,334   3/1972   Abeck et al. ..................... 252/62.56

FOREIGN PATENTS OR APPLICATIONS 783,021   6/1971   Belgium............................. 423/634
1,138,750   10/1962   Germany ........................... 423/634
1,176,111   8/1964   Germany ........................... 423/634
1,592,398   12/1970   Germany ........................... 423/634

Primary Examiner—Oscar R. Vertiz
Assistant Examiner—Brian E. Hearn
Attorney, Agent, or Firm—Connolly and Hutz

[57] ABSTRACT

Process for producing ferromagnetic iron oxides whereby a solution of a ferrous salt is oxidized in the presence of $\alpha$-FeO(OH) seed, a basic precipitant, and phosphoric acid or a water soluble salt thereof to form $\alpha$-FeO(OH), which can be dehydrated, optionally tempered, reduced and re-oxidized to needle-shaped $\gamma$-Fe$_2$O$_3$. The resulting product has high coercive force values which make it especially useful for magnetic impulse recording and reproduction.

9 Claims, No Drawings

PRODUCTION OF GAMMA IRON OXIDE

This application is a continuation-in-part of application U.S. Ser. No. 249,547, filed May 2, 1972 now abandoned.

This invention relates to a process for the production of highly coercive needle-shaped magnetic iron oxides by way of the intermediate $\alpha$-FeO(OH). These resulting magnetic iron oxides are particularly suitable for magnetic impulse recording and reproduction.

It is known that needle-shaped $\alpha$-FeO(OH) particles with a length-to-width ratio of from 2 : 1 to 20 : 1 can be used as starting materials for the production of magnetic iron oxides. This acicular, non-magnetic iron oxide hydroxide is dehydrated at elevated temperature into $\alpha$-Fe$_2$O$_3$ without any change in its external form, optionally tempered, converted into Fe$_3$O$_4$ by treatment with reducing gases and subsequently reoxidized into $\gamma$-Fe$_2$O$_3$. The magnetic properties of $\gamma$-Fe$_2$O$_3$ obtained in this way are largely predetermined by the size and shape anisotropy of the $\alpha$-FeO(OH) starting material. The particle size, which can readily be adjusted by interrupting the pigment-forming process at any stage of growth, is selected in such a way that, following conversion into $\gamma$-Fe$_2$O$_3$, the required magnetic properties are obtained. The length-to-width ratio of the needles which determines coercive force must be adjusted in the $\alpha$-FeO(OH) itself, and conversion into $\gamma$-Fe$_2$O$_3$ should be carried out with little or no change in the shape of the needles.

It is repeatedly mentioned in the Patent literature (Dutch Patent No. 6,406,512, DAS No. 1,138,750, U.S. Pat. No. 2,694,656) that dehydration of $\alpha$-FeO(OH) at temperatures of up to 816°C or tempering of the $\alpha$-Fe$_2$O$_3$ should lead to an improvement in the magnetic properties of $\gamma$-iron oxides thus obtained. This tempering process coarsens the particles which, although desirably eliminating the print through, nevertheless has an adverse effect upon other properties of the $\gamma$-Fe$_2$O$_3$. Thus, in addition to the reduction in coercive force, deterioration in noise behaviour is another important change which occurs, undesirably so far as the transmission of sound is concerned.

In U.S. Pat. No. 3,382,174 there is described a process for making $\gamma$-Fe$_2$O$_3$ or red $\gamma$-Fe$_2$O$_3$ commencing with $\gamma$-FeO(OH) seed. Such seed can be produced by the same general process as $\gamma$-FeO(OH) except that the seed formation is performed quickly, preferably in less than 30 minutes. The $\gamma$-FeO(OH) seed is used in forming $\gamma$-FeO(OH) in the presence of a phosphorus or arsenic compound as a stabilizer and the $\gamma$-FeO(OH) may be dehydrated to $\gamma$-Fe$_2$O$_3$. Such pigments, however, have only the usual levels of coercive force.

It is an object of the invention to provide $\gamma$-Fe$_2$O$_3$ pigment characterized by high coercive force.

This and other objects and advantages are realized in accordance with the present invention which relates to the production of ferromagnetic iron oxides by the steps comprising oxidizing a solution of a ferrous salt in the presence of $\alpha$-FeO(OH) seed and a basic precipitant which acts as a proton acceptor thereby to form $\alpha$-FeO(OH) pigment, dehydrating said $\alpha$-FeO(OH) pigment to $\alpha$-Fe$_2$O$_3$, reducing said $\alpha$-Fe$_2$O$_3$ to Fe$_3$O$_4$ and re-oxidizing said Fe$_3$O$_4$ to $\gamma$-Fe$_2$O$_3$ having a needle length-to-width ratio of from 2:1 to 20:1, the improvement which comprises adding to said solution at the beginning of or during pigment formation phosphoric acid or a water soluble salt thereof in an amount, calculated as P$_2$O$_5$, of about 0.1 to 4% by weight of the $\alpha$-FeO(OH) pigment produced, whereby the $\gamma$-Fe$_2$O$_3$ ultimately produced is of high coercive force.

It has been found that the presence of phosphate ions during pigment formation surprisingly leads to an $\alpha$-FeO(OH) from which considerably improved magnetic iron oxides can be otained by dehydration into $\alpha$-Fe$_2$O$_3$, optionally tempering of the $\alpha$-Fe$_2$O$_3$ reduction to Fe$_3$O$_4$ and subsequent reoxidation to acicular $\gamma$-Fe$_2$O$_3$, having a length-to-width ratio of from 2 : 1 to 20 : 1. Compared with non-phosphated $\alpha$-FeO(OH), the $\alpha$-FeO(OH) which has been phosphated during pigment formation can be converted into $\alpha$-Fe$_2$O$_3$ over a wider range of conditions. Even with a quantity of phosphate corresponding to between 0.6 and 0.7 % P$_2$O$_5$ in the product, temperatures of up to 850°C can be applied during dehydration or a subsequent tempering operation without any danger of the needles being sintered. Surprisingly, the controlled tempering of such phosphated products leads to a further desirable improvement in the magnetic properties to an extent hitherto unknown. Tempering of the $\alpha$-Fe$_2$O$_3$ can be performed at temperatures from about 400° to 900°C, preferably from 600° to 830°C. The desired improvements of the properties at low temperatures (up to about 600°C) occur only after a long tempering period. With increasing temperature the tempering periods become shorter and only amount 10 to 15 minutes at 820°C. Above 850°C with phosphate containing pigments too soon sintering and largely destruction of the needle form begins: thus such high temperatures hardly must be taken into consideration for technical application. In addition to a weaker print through and favorable noise behavior, $\gamma$-iron oxide produced in this way shows peak coercive force values of up to 488 Oe in the powder.

The improved $\gamma$-Fe$_2$O$_3$ is eminently suitable for the production of magnetogram supports such as tapes, plates, strips for films or punched cards, etc. Production of the storage elements for the recording of magnetic impulses of any kind, such as acoustic signals, visible images or other types of information, is carried out by methods known per se. The ferromagnetic $\gamma$-Fe$_2$O$_3$ is suspended in a binder with the assistance of a suitable dispersant, and is applied in at least one layer to a non-magnetic supporting material. Suitable supporting materials include flexible or rigid materials such as paper, plastics, ceramics or metals. In the required form, these materials are coated by known methods with a lacquer produced from a ferromagnetic pigment, binder, solvent, and a suitable dispersant. After coating, the material is dried and, optionally, calendered.

Magnetogram supports containing highly coercive magnetic iron oxides free from foreign metals are desirable for various reasons. They are more suitable than products with low-coercivity and normal-coercivity for, for example, the transmission of short wavelengths. Thus, the influence of the demagnetising effect can be suppressed with highly coercive pigments, making it possible to produce tapes with smaller band constants. The lower the ratio of remanence to coercive force the better is the transmission of high frequencies. Tapes with high intrinsic coercive forces thus guarantee a linear frequency response up to the limit of human hearing and, hence, faithful reproduction of the sound-determining overtones.

Ferromagnetic materials of relatively high coercive force are also more suitable for video purposes by virtue inter alia of their higher recording density.

Further advantages of γ-iron oxides with high coercivity arise when they are used in conventional recording materials, for example sound tapes, because it is possible to carry out a number of measures which normally cause a reduction in the coercive force. For example, greater consolidation is possible by grinding the pigments, leading to lower oil numbers and improved dispersibility. In the case of materials with normal coercivity, the coercive force would be reduced to such an extent that it would no longer be appropriate to use such pigments as these.

The phosphated magnetic iron oxides according to the invention with their improved magnetic properties are obtained by producing the phosphate-containing needle-shaped γ-FeO(OH) starting material, for example in accordance with the precipitation process described in Offenlegungsschrift No. 1,592,398, with the addition of phosphate ions during or before pigment formation. In accordance therewith, α-FeO(OH) with a length-to-width ratio of from 2 : 1 to 20 : 1 is obtained by oxidizing an iron (II) salt solution with atmospheric oxygen or another oxidizing agent, such as chlorine, chlorate, nitrate or nitrobenzene, in the presence of α-FeO(OH) seeds using basic precipitants or substances which can act as proton acceptors at pH values in the range of 2 to 7, such as soda, ammonia, urotropin, sodium hydroxide or metallic iron. The process is controlled in such a way that the pH value is always in the acid range. Pigment formation takes place at temperatures of from 40° to 95°C at a rate of from 0.5 to 15 g/l/hour, preferably at a rate of from 3 to 8 g/l/hour, with the phosphate ions being added either in a single batch or continuously, steps being taken to ensure that the oxidising agent, the basic precipitant and the phosphate ions added are thoroughly distributed. Suitable phosphate ion donors include phosphoric acids such as orthophosphoric acid, pyrophosphoric acid and metaphosphoric acid and their water-soluble salts.

The process is unaffected by any fluctuations in phosphate ion concentration that may occur during measured introduction of the phosphate ions. Thus, products which are substantially equal in quality are obtained irrespective of whether the phosphate is added all at once, continuously or in several stages. Nor does it matter whether the entire quantity of phosphate is added at the beginning of pigment formation or at some later stage. The phosphate or the phosphoric acid can be added to the reaction medium either directly or diluted with water. One particularly technically simple way is to add the phosphate to the precipitant, for example to the sodium hydroxide solution. In this connection it is again possible to add both phosphates and free phosphoric acid dissolved in the precipitant. The total quantity of phosphate present, i.e. added at the beginning of or during pigment formation, based on α-FeO(OH), can be between about 0.1 and 4% by weight calculated as $P_2O_5$, advantageously about 0.2 to 2% and preferably between about 0.2 and 1.4%.

The α-$Fe_2O_3$ with the least tendency towards particle coarsening is obtained by dehydration of α-FeO(OH) which has a phosphate content of from 0.04 to 0.8%, especially 0.4 to 0.8%, calculated as $P_2O_5$. By the novel process it is possible to obtain γ-$Fe_2O_3$ particles exhibiting coercive force values of at least about 370 Oe, and preferably in excess of 400 Oe, such particles also including $P_2O_5$ to the extent of about 0.12 to 2.0% and preferably to between 0.24 and 1.68%.

As already repeatedly mentioned, the properties of the γ-$Fe_2O_3$ are governed by the dimensions of the γ-FeO(OH) pigment particles. The particle form itself is in turn largely determined by the seeds used for pigment formation. The formation of α-FeO(OH) seeds is carried out, for example, by partly (preferably 12 to 70%) precipitating the $Fe^{2+}$ ions, either with alkali or with $Na_2CO_3$, from a solution of an iron (II) salt in the form of $Fe(OH)_2$ and oxidizing this with an oxidizing agent, preferably air, to form the α-FeO(OH) seeds. Vigorous stirring is provided for the oxidation and hydrolysis which proceed in the presence of an excess of air at temperatures of from 0° to 60°C in accordance with the following equation:

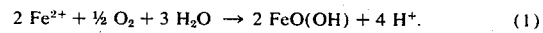

$$2\ Fe^{2+} + \tfrac{1}{2}\ O_2 + 3\ H_2O \rightarrow 2\ FeO(OH) + 4\ H^+. \qquad (1)$$

The pH value decreases during the reaction and seed formation stops at a pH value of approximately 3. It is known (DAS No. 1,176,111) that the precipitation and oxidation of iron (II) hydroxide from a solution of an iron (II) salt can be carried out in the presence of phosphate ions. In this way it is possible to influence the shape of the needles and, more particularly, to change the length-to-width ratio in the α-FeO(OH). Another advantage is the improvement obtained in the volume-time yield by increasing the growth rate, without any danger of excessive overgrowth or of dendrite formation on the needles. This effect of the phosphate ions during seed formation can lead to the required products and, following conversion into γ-$Fe_2O_3$, can give, for example, low-noise magnetic iron oxides.

The addition of phosphate before and during seed formation is totally different from the addition of phosphate before or during pigment formation as especially shown in Examples 13 to 15 herein below. Whereas the shape of the α-FeO(OH) needles is influenced by the phosphate added during seed formation, the addition of phosphate during pigment formation brings about a change in behaviour during the conversion of α-FeO(OH) into α-$Fe_2O_3$ and γ-$Fe_2O_3$. It is shown in the Examples that the addition of phosphate during the pigment-forming process brings about an improvement in the properties both of the α-iron oxide hydroxide produced with phosphate containing seeds and also of the α-iron hydroxides produced with non-phosphate-containing seeds, following their conversion into γ-$Fe_2O_3$. Production of the γ-$Fe_2O_3$ in accordance with the invention is described in the following 15 Examples, the production of magnetogram supports being additionally described in Examples 2 and 3.

EXAMPLE 1 a. Seed formation

Following the procedure described in British Patent Specification No. 923,038, part of the $Fe^{2+}$ is precipitated at 50°C from 22.4 liters of a molar $FeSO_4$ solution by the rapid addition of a solution of 920 g of NaOH in 2.52 liters of $H_2O$. Thereafter, the $Fe(OH)_2$ precipitated is oxidised into α-FeO(OH) seeds with vigorous stirring in a powerful air stream (1750 liters of air per hour) over a period of approximately 80 minutes during which the temperature rises to 60° to 65°C and the pH value falls to around 3.3. The yellowishgreen seed suspension thus prepared contains 39 g/l of FeO(OH)

and approximately 64 g/l of $FeSO_4$ and, hence, corresponds to a degree of precipitation of 51.6%.

b. Pigment formation 23 liters of a seed suspension containing 897 g of FeO(OH) seed prepared as in Example 1(a) and 64.3 g/l of $FeSO_4$, are heated to 80°C, after which air is passed through at a rate of 500 liters per hour. At the same time and with intensive stirring 4.1 liters of a sodium hydroxide solution (190 g/l of NaOH) are added dropwise at such a rate that the pH value rises from an initial 3.3 to pH 7 over a period of 5.5 hours. As the sodium hydroxide solution is being added, a solution of 69.6 g of $Na_3PO_4 \cdot 12 H_2O$ in 1000 ml of water (corresponding to 0.7% $P_2O_5$, based on the $\alpha$-FeO(OH) end product) is continuously introduced during pigment formation. Pigment formation is regarded as over and the addition of sodium hydroxide and phosphate stopped when the pH value has risen to 7 and, hence, all the iron ions precipitated. Finally, the pH value is restored to 4 with dilute sulphuric acid, followed by stirring for 15 minutes. The mixture is filtered, washed with water on the filter, mased once and then dispersed for 5 minutes by vigorous stirring filtered off and dried. Phosphate analysis reveals 0.63% $P_2O_5$ in the dried $\alpha$-FeO(OH).

c. Conversion into $\gamma$-$Fe_2O_3$ is carried out by known methods

Dehydration of the $\alpha$-FeO(OH) at 400°C, tempering of the $\alpha$-$Fe_2O_3$ for 1 hour at 780°C, reduction to $Fe_3O_4$ at 440°C with hydrogen laden with water vapour followed, after cooling in a stream of nitrogen, by reoxidation at 290°C to form $\gamma$-$Fe_2O_3$. Thereafter, the pigment which was treated with phosphate during pigment formation shows a remanence value of $Br/\rho = 438$ $G.cm^3g^{-1}$ and a coercive force of $I_{Hc}$ of 438 Oe in the powder. An $\alpha$-FeO(OH) which has been treated in exactly the same way, except that it was not phosphated during pigment formation, withstands only a temperature of 730°C during tempering without reduction in remanence and thereafter shows a coercive force of only 307 Oe for a remanence of $Br/\rho = 438$ $G.cm^3g^{-1}$.

EXAMPLE 2

An iron sulphate solution is prepared by dissolving 525 kg of $FeSO_4 \cdot 7 H_2O$ in 2600 liters of water, followed by the addition of 75 kg of NaOH dissolved in 360 liters of water over a period of 28 minutes. Air is passed through this suspension with vigorous stirring, and the iron (II) hydroxide oxidised over a period of 2.5 hours at 40°C into $\alpha$-FeO(OH) seeds. The pH value falls to between 3 and 3.5. The suspension is then heated to 80°C and an $\alpha$-FeO(OH) pigment is obtained therefrom as a starting material for highly coercive $\gamma$-$Fe_2O_3$ by oxidation of the residual $Fe^{2+}$ with air, followed by precipitation. Precipitation is carried out over 5 to 6 hours by the gradual addition of a solution of 75 kg of NaOH and 1.78 kg of 85% phosphoric acid in 660 liters of water. Pigment formation is complete at a pH value of 7. Thereafter, the pigment suspension is adjusted to pH 3 – 5 with dilute sulphuric acid, filtered off, washed and dried. Analysis of the $\alpha$-FeO(OH) gives the following results: 95.7% FeO(OH), 0.59% $P_2O_5$, 1.46% $SO_4^{2-}$. Conversion into $\gamma$-$Fe_2O_3$ by dehydration at 400°C, tempering of the $\alpha$-$Fe_2O_3$ for 30 minutes at 760°C, reduction with steam-laden hydrogen at 400°C and reoxidation after cooling under nitrogen at 250° to 300°C. Magnetic properties of the powder: $I_{Hc} = 473$ Oe, $Br/\rho = 477$ $G.cm^3g^{-1}$.

144 g of the $\gamma$-$Fe_2O_3$ described above are stirred into a dispersion with 9.7 g of a copolymer of polyvinyl chloride and polyvinyl acetate (85 : 14 parts by weight, $\rho = 1.36$ g $cm^{-3}$) in a mixture of 115 ml of butylacetate, 2.4 ml of oleic acid and 324 ml of ethylacetate, followed by grinding for 24 hours in a vibratory mill. After grinding, 15.2 g of a polyester of 3 mols of adipic acid, 2 mols of 1,3-butane diol and 2 mols of hexanetriol ($\rho = 1.12$ g $cm^{-3}$) are added, thus giving a volume filling level of 42%. By volume filling level is meant the concentration of magnetic material in the magnetic portion of the recording member in percent by volume. A 30 $\mu$ thick polyester film is coated with the lacquer giving a $\gamma$-$Fe_2O_3$ coating of 20 g/$m^{-2}$. After drying, an approximately 12 to 14 $\mu$ thick layer is obtained. Magnetic value of the tape: $I_{Hc} = 416$ Oe.

EXAMPLE 3

The procedure is as in Example 2, except that pigment formation is carried out with a liquor which instead of 1.78 kg of 85% phosphoric acid contains 5.9 kg of dissolved $Na_3PO_4 \cdot 12 H_2O$. The phosphate-containing $\alpha$-FeO(OH) is further processed by dehydration to $\alpha$-$Fe_2O_3$, tempering at 750°C for 30 minutes, reduction and reoxidation in accordance with Example 2. Magnetic properties of the powder: $Br/\rho = 464$ $G.cm^3g^{-1}$, $I_{Hc} = 458$ Oe. Processing into magnetic tape in accordance with Example 2 gives coercive forces in the tape of 396 Oe.

EXAMPLE 4

$\gamma$-$Fe_2O_3$ produced as in Example 2 except that, instead of being tempered for 30 minutes at 760°C, the $\alpha$-$Fe_2O_3$ is tempered for 15 minutes at 800°C. Magnetic values for the powder: $Br/\rho = 477$ $G.cm^3g^{-1}$, $I_{Hc} = 483$ Oe. Tempering for 15 minutes at 830°C gives magnetic values of $Br/\rho = 464$ $G.cm^3g^{-1}$ and $I_{Hc} = 488$ Oe.

EXAMPLE 5

23 liters of a seed produced in accordance with Example 1(a) are heated to 80°C with 897 g of FeO(OH) and 64 g/liter of $FeSO_4$, the $Fe^{2+}$-ions present are oxidized with vigorous stirring using 500 liters of air per hour and precipitated with a liquor. The liquor used as precipitant contains 780 g of NaOH and 34.8 g of $Na_3PO_4 \cdot 12 H_2O$ dissolved in 6.66 liters of water (corresponding to 0.35% $P_2O_5$, based on the final quantity of $\alpha$-FeO(OH)). Conversion of the $\alpha$-FeO(OH) containing 0.37% $P_2O_5$ into $\gamma$-$Fe_2O_3$ in accordance with Example 1, with tempering of the $\alpha$-$Fe_2O_3$ for 1 hour at 750°C, gives the following magnetic values in the powder: $Br/\rho = 463$ $G.cm^3g^{-1}$; $I_{Hc} = 414$ Oe.

EXAMPLE 6

$\alpha$-FeO(OH) is prepared as in Example 5 except that, instead of 34.8 g, 139.2 g of $Na_3PO_4 \cdot 12 H_2O$ are added to the sodium hydroxide used as the precipitant during pigment formation. This $\alpha$-FeO(OH) which contains 1.28% $P_2O_5$ is dehydrated and converted with tempering of the $\alpha$-$Fe_2O_3$ at 700°C into a ferromagnetic pigment with the following magnetic properties: $Br/\rho = 429$ $G.cm^3g^{-1}$; $I_{Hc} = 396$ Oe.

EXAMPLE 7

23 liters of a seed suspension produced as described in Example 1(a) and containing 39.5 g/liter of FeO(OH) and 64.2 g/liter of $FeSO_4$ are oxidized with air at 80°C while being stirred at 1500 r.p.m. and precipitated with sodium hydroxide solution containing 190 g/liter of NaOH. After 2.5 hours, a solution of 18.2 g of $NaPO_3$ in 600 ml of water is added dropwise at the same time as the precipitant during the second half of pigment formation. Further processing of the phosphate-containing α-FeO(OH) as in Example 1c and tempering for 1 hour at 750°C during conversion into γ-$Fe_2O_3$ gives the following magnetic values: $Br/\rho$ = 450 $G.cm^3g^{-1}$; $I_{Hc}$ = 441 Oe. The α-FeO(OH) starting product has a phosphate content of 0.65% $P_2O_5$.

EXAMPLE 8

A seed suspension produced in accordance with Example 1 (a) is oxidized by passing air through it at a rate of 500 liters per hour, and some of the $Fe^{3+}$ ions formed are partly precipitated over a period of 3 hours at 75° – 85°C with 360 g of commerical-grade NaOH commercial-grade 69.6 g of $Na_3PO_4$ . 12 $H_2O$ in 3.33 liters of water. Addition of the phosphate is confined to the first half of pigment formation. Thereafter, the remaining $Fe^{2+}$-ions are oxidized over a period of another 200 minutes and quantitatively precipitated with 360 g of NaOH in 3.3 liters of water. Further processing as in Example 7 leads to a product with magnetic properties of $Br/\rho$ 454 $G.cm^3g^{-1}$ and $I_{Hc}$ = 436 Oe. The α-FeO(OH) has a phosphate content of 0.77% $P_2O_5$.

EXAMPLE 9

A solution of 40 g of $Na_4P_2O_7$ . 10 $H_2O$ in 500 ml of water is added dropwise to 23 liters of a seed suspension produced in accordance with Example 1(a) while the suspension is heated from 45° to 85°C. This is followed by oxidation with air, after which the remaining Fe ions are precipitated with 760 g of NaOH in 4 liters of water over a period of 4 hours and 20 minutes. At the end of precipitation, the pH-value is 7 and is subsequently adjusted to a value of 3 with dilute sulphuric acid. After 15 minutes, the product is filtered off, washed and dried. Conversion into γ-$Fe_2O_3$, during which the α-$Fe_2O_3$ intermediate product is tempered for 1 hour at 730°C, gives a product with the following magnetic properties which are compared with a similarly treated nonphosphated product:

phosphated: 0.65% of $P_2O_5$   $Br/\rho$   471 $G.cm^3g^{-1}$   $I_{Hc}$ = 423 Oe
non-phosphated:   $Br/\rho$   438 $G.cm^3g^{-1}$   $I_{Hc}$ = 307 Oe

EXAMPLE 10 a. Seed formation

From 6.2 kg of $FeSO_4$ . 7 $H_2O$ dissolved in 19.88 liters of water 52% of $Fe^{2+}$-ions are quickly precipitated with a solution containing 920 g of NaOH and 42 g of $Na_3PO_4$ . 12 $H_2O$ in 2.52 liters of water at 40° to 60°C, and quickly oxidized into α-FeO(OH) with 1750 liters of air per hour using a gassing stirrer. After 76 minutes, the temperature has risen to 63°C and the pH value fallen to 3.5. The seed suspension formed contains 40.3 g/liters of FeO(OH) and 63.6 g/liter of $FeSO_4$.

b. Pigment formation

The $F^{2+}$-ions present in 23 liters of this seed suspension are oxidized with air and precipitated with 790 g of NaOH and 69.6 g of $Na_3PO_4$ . 12 $H_2O$ in 6.6 liters of water over a period of 350 minutes at 75° to 85°C. The pH value rises to 9.4 and can be restored to pH 3 – 5 with sulphuric acid or with perchloric acid before filtration.

For comparison, a pigment is prepared with the same seed suspension, but without any phosphate in the precipitant, and further processed in exactly the same way as the phosphated pigment. After washing, drying and conversion into γ-$Fe_2O_3$, the following results are obtained:

|  | %$P_2O_5$ | Tempering (°C) | $Br/\rho$ ($G.cm^3g^{-1}$) | $I_{Hc}$(Oe) |
|---|---|---|---|---|
| Seed and pigment formation, phosphated | 1.17 | 1 h/730 none | 422 441 | 439 356 |
| Seed formation pigment formation | 0.44 | none 1 h/730 | 454 457 | 300 399 |

EXAMPLE 11

Seed formation is carried out as in Example 4 except that it is carried out at 25°C by precipitating 51.5% of the iron (II) ions with NaOH, followed by rapid oxidation with 750 liters of air per hour over a period of 80 to 100 minutes, the temperature rising to 40°C and the pH value falling to 3.5. Pigment formation is carried out by oxidation with air followed by precipitation of the remaining iron with sodium hydroxide solution as in Example 1, a solution of 40 g of $Na_4P_2O_7$ . 10 $H_2O$ in 500 ml of water being continuously added simultaneously with the precipitant during the last 10% of the total precipitation period of 4 hours and 30 minutes. Tempering of the α-$Fe_2O_3$ at 750°C leads to a product with the following magnetic properties: $Br/\rho$ = 445 $G.cm^3g^{-1}$ and $I_{Hc}$ = 423 Oe. $P_2O_5$ analysis reveals 0.72%, based on α-FeO(OH).

EXAMPLE 12

3.28 liters of seed prepared as in Example 1(a), 553 g of iron tape and 1720 ml of water are introduced into a 6 liter pot equipped with a stirring mechanism and a water bath. The suspension thus contains 26.0 g per liter of α-FeO(OH) seed and 40.4 g/liter of $FeSO_4$. After heating to around 80°C, the $Fe^{2+}$ is oxidized into $Fe^{3+}$ by passing air through at a rate of 16 liters per hour while stirring at 150 r.p.m., and then the $Fe^{3+}$-ions formed are fully hydrolysed. In this process, the protons formed in accordance with equation (1) are collected by metallic iron. During the test period of 71 hours, the rotational speed of the stirrer is gradually increased to 350 r.p.m., the supply of air increased after 48 hours to 50 liters per hour and thus the total growth rate of α-FeO(OH) adjusted from 0.173 g/l/h after 22 hours to 0.805 g/l/h after 71 hours. A solution of 19.2 g of $Na_3PO_4$ . 12 $H_2O$ in 500 ml of water is continuously added dropwise throughout pigment formation.

After the growth reaction has been stopped, the suspension is flushed through a 16,900 mesh screen at pH 3.5, filtered under suction, re-suspended for 5 minutes in water by vigorous stirring, re-filtered under suction and washed repeatedly on the suction filter. Drying at 120° to 130°C gives a yield of 417 g of $\alpha$-FeO(OH). Analysis gives a $P_2O_5$ content of 0.84%. Conversion into $\gamma$-$Fe_2O_3$ is carried out as in Example 1(c), except that on this occasion tempering is carried out for 1 hour at 700°C instead of at 780°C. The magnetic properties of the $\gamma$-$Fe_2O_3$ thus obtained after tempering are as follows: $Br/\rho = 433$ $G.cm^3g^{-1}$ and $I_{Hc} = 410$ Oe. Tempering at 750°C: $Br/\rho = 441$ $G.cm^3g^{-1}$ and $I_{Hc} = 424$ Oe.

Under the same working-up and production conditions, an $\alpha$-FeO(OH) suspension similarly produced, but without any phosphate, only gives magnetic values of $Br/\rho = 470$ $G.cm^3g^{-1}$ and $I_{Hc} = 377$ Oe. Tempering at 750°C gives magnetic values of $Br/\rho = 469$ $G.cm^3g^{-1}$ and $I_{Hc} = 339$ Oe.

EXAMPLE 13 a. $\alpha$-FeO(OH) formation with phosphate addition during seed formation 6200 g $FeSO_4$ . $7H_2O$ in 19.8 liters of distilled $H_2O$ are mixed with a solution of 910 g NaOH and 63.8 g $Na_3PO_4$ . 12 $H_2O$ (corresponding to 0.6% by weight of $P_2O_5$, based on the total $\alpha$-FeO(OH) produced) in 2.4 liters of distilled $H_2O$ and oxidised with 1750 liters of air per hour at 43°C under vigorous stirring over a period of 56 minutes.

At the end of the seed formation the suspension has a yellow-brown colour. 3 liters of this suspension are taken off and the remainder is heated to a temperature of 80°C. Pigment formation is performed by adding 650 ml of sodium hydroxide solution (containing 190 g of NaOH per liter) and 500 liters of air per hour. The pH-value thereby rises to a value of about 7. The suspension is filtered, washed with water and dried at 120°C.

b. The dried $\alpha$-FeO(OH) product of (a) is heated under $N_2$-atmosphere to a temperature of 380°C, and reduced at that temperature for 30 minutes with moist hydrogen to $Fe_3O_4$ and thereafter reoxidised by air to $\gamma$-$Fe_2O_3$ at a temperature of 250° – 280°C over 40 minutes.

c. The process of (b) is repeated except that the reduction is performed at a temperature of 420°C.

d. The process of (b) is repeated except that the reduction is performed at a temperature of 450°C.

EXAMPLE 14 a. $\alpha$-FeO(OH) formation with same total phosphate addition divided during seed and pigment formation.

According to Example 13(a) $\alpha$-FeO(OH) is produced with the following amounts of materials:

6200 g of $FeSO_4$ . $7H_2O$ in 19.8 liters of distilled water 910 g of NaOH and 31.9 g of $Na_3PO_4$ . 12 $H_2O$ (corresponding to 0.3% by weight of $P_2O_5$, based on the total $\alpha$-FeO(OH) produced) in 2.4 liters of distilled water. The seed formation time is 56 minutes. Pigment formation is performed after separating 3 l of the seed suspension with 600 ml sodium hydroxide solution (containing 190 g NaOH per liter) and 500 liters of air per hour at 80°C for 7 hours. 27.5 g of $Na_3PO_4$ . 12 $H_2O$ are added to the sodium hydroxide solution, corresponding to 0.3% by weight of $P_2O_5$, based on the total $\alpha$-FeO(OH) produced).

b – d. Reduction to $Fe_3O_4$ and reoxidation to $\gamma$-$Fe_2O_3$ is performed analogously to Example 13 b – d.

EXAMPLE 15 a. $\alpha$ - FeO(OH) formation with addition of phosphate merely during pigment formation.

According to Example 13(a) the seed suspension is produced with 6200 g of $FeSO_4$ . $7H_2O$ in 1.8 liters of distilled $H_2O$ and 910 g NaOH in 2.4 liters of distilled $H_2O$ over 61 minutes. Pigment formation is performed after separation of 3 liters of the seed suspension with 600 ml sodium hydroxide solution per hour (containing 190 g NaOH per liter) and 500 liters of air per hour at 80°C within about 7½ hours. At the end of the pigment formation the pH of the suspension is about 7. The sodium hydroxide solution contains 55.0 g $Na_3PO_4$ . 12 $H_2O$, corresponding to 0.6% by weight of $P_2O_5$, based on the total weight $\alpha$-FeO(OH) produced.

b – d. Reduction to $Fe_3O_4$ and reoxidation to $\gamma$-$Fe_2O_3$ is performed according to Example 13 (b) – (d).

The following table shows the coercive force values and the remanence values for the untempered $\gamma$-$Fe_2O_3$ pigments produced according to Examples 13 (b)–(d), 14 (b)–(d) and 15 (b)–(d).

| Example | Coercive force Oersteds | remanence $G.cm^3 g^{-1}$ |
|---|---|---|
| 13 b | 272 | 423 |
| c | 276 | 432 |
| d | 269 | 419 |
| 14 b | 310 | 411 |
| c | 311 | 424 |
| d | 326 | 422 |
| 15 b | 371 | 424 |
| c | 388 | 437 |
| d | 403 | 436 |

It will be appreciated that the instant specification and Examples are set forth by way of illustration and not limitation, and that various modifications and changes may be made without departing from the spirit and scope of the present invention.

What is claimed is:

1. In the process of producing ferromagnetic iron oxides by the steps comprising oxidizing a solution of a ferrous salt in the presence of $\alpha$-FeO(OH) seed and a basic precipitant which acts as a proton acceptor thereby to form $\alpha$-FeO(OH) pigment, dehydrating said $\alpha$-FeO(OH) pigment to $\alpha$-$Fe_2O_3$, reducing said $\alpha$-$Fe_2O_3$ to $Fe_3O_4$ and re-oxidizing said $Fe_3O_4$ to $\gamma$-$Fe_2O_3$ having a needle length-to-width ratio of from 2:1 to 20:1, the improvement which comprises adding to said solution at the beginning of or during pigment formation phosphoric acid or a water soluble salt thereof in an amount, calculated as $P_2O_5$, of about 0.1 to 4% by weight of the $\alpha$-FeO(OH) pigment produced, whereby the $\gamma$-$Fe_2O_3$ ultimately produced is of high coercive force.

2. The process of claim 1 wherein said solution is maintained at a pH of about 2 to 7 and at a temperature of about 40° to 95°C, oxidizing of said ferrous salt being performed at a rate of about 0.5 to 15 g/l/hour.

3. The process of claim 2, wherein oxidizing is performed at a rate of about 3 to 8 g/l/hour.

4. The process of claim 1 wherein said phosphoric acid or water-soluble salt thereof is first dissolved in the basic precipitant and the mixture thereof is added to said ferrous salt solution.

5. The process of claim 1 wherein said $\alpha$-$Fe_2O_3$ is tempered at a temperature of about 400° to 900°C prior to said reduction to $Fe_3O_4$.

6. The process of claim 1 wherein said $\alpha$-$Fe_2O_3$ is tempered at a temperature of about 600° to 830°C prior to said reduction to $Fe_3O_4$.

7. The process of claim 1 wherein said $\alpha$-FeO(OH) seed was produced in the presence of phosphate ions.

8. The process of claim 1 wherein the phosphoric acid or water-soluble salt thereof calculated as $P_2O_5$ is added in about 0.2 to 2% by weight of the $\alpha$-FeO(OH) pigment produced.

9. The process of claim 1 wherein said $\alpha$-FeO(OH) seed was produced in the presence of phosphate ions, the phosphoric acid or water-soluble salt thereof is first dissolved in the basic precipitant and the mixture thereof is added to said ferrous salt solution in an amount to provide about 0.2 to 2% of $P_2O_5$ by weight of the $\alpha$-FeO(OH) pigment ultimately produced, said solution is maintained at a pH of about 2 to 7 and at a temperature of about 40° to 95°C, oxidizing of said ferrous salt being performed at a rate of about 3 to 8 g/l/hour, and the $\alpha$-$Fe_2O_3$ is tempered at a temperature of about 600° to 830°C prior to said reduction to $Fe_3O_4$.

* * * * *